(12) United States Patent
Davis (10) Patent No.: US 6,923,147 B1
(45) Date of Patent: Aug. 2, 2005

(54) ANIMAL CONTROL SYSTEM

(76) Inventor: James E. Davis, 26 Austin Rd., Wilmington, DE (US) 19810-2203

( * ) Notice: Subject to any disclaimer, the term of this patent is extended or adjusted under 35 U.S.C. 154(b) by 0 days.

(21) Appl. No.: 10/741,833

(22) Filed: Dec. 22, 2003

Related U.S. Application Data (63) Continuation-in-part of application No. 10/261,103, filed on Oct. 1, 2002, now Pat. No. 6,684,820.

(51) Int. Cl.$^7$ .............................................. A01K 15/00

(52) U.S. Cl. ..................... 119/721; 119/908; 340/573.1

(58) Field of Search ........................ 119/721, 908, 719, 119/720; 340/573.1

(56) References Cited

U.S. PATENT DOCUMENTS

| | | | | |
|---|---|---|---|---|
| 5,241,923 A | * | 9/1993 | Janning | 119/721 |
| 5,412,557 A | * | 5/1995 | Lauw | 363/37 |
| 5,682,839 A | * | 11/1997 | Grimsley et al. | 119/721 |
| 5,808,551 A | * | 9/1998 | Yarnall et al. | 340/573.4 |
| 6,269,776 B1 | * | 8/2001 | Grimsley et al. | 119/721 |
| 6,415,742 B1 | * | 7/2002 | Lee et al. | 119/721 |
| 6,474,269 B2 | * | 11/2002 | So | 119/720 |
| 6,600,422 B2 | * | 7/2003 | Barry et al. | 340/573.3 |

\* cited by examiner

Primary Examiner—Yvonne R. Abbott (57) ABSTRACT

An animal control system generates an on-off correction stimulus using a small transformer and rectifies the high voltage output to give an unfiltered unipolar voltage applied to electrodes as a correction stimulus. A small, efficient power isolation system. A programming signal can be applied to the electrodes to affect control parameters of the control system.

8 Claims, 4 Drawing Sheets

ANIMAL CONTROL SYSTEM

FIELD OF THE INVENTION

This invention relates to a system for controlling the behavior of an animal. This is a continuation-in-part of Application/Control No. 10/261,103 filed Oct. 1, 2002 now U.S. Pat. No. 6,684,820.

BACKGROUND OF THE INVENTION

Animal control systems are useful to control an animal's behavior. Examples include a) containment or exclusion systems to contain an animal within a region such as a yard or to exclude an animal from a region such as a room, food table, sofa, bed or chair, b) training systems to modify the animal's behavior, and c) bark inhibitor systems for dogs. The systems are usually attached to a collar for the animal. A behavior modification signal or correction stimulus is typically an audio sound. A stronger correction stimulus may be an electric shock. While such control systems have been miniaturized as technology has improved, they are still too large and too heavy for a small animal such as a lap dog or small cat. There remains a need for control system circuits that minimize the number of parts and that perform functions in a different mode to permit a reduction in weight and volume.

Animal control has long been accomplished by application of electrical shock. The means for generation of the electrical shock fall into 4 modes.
  1 induction coil,
  2 alternating current, typically with a step-up transformer,
  3 direct current, typically rectified from a step-up transformer and filtered,
  4 pulse, typically by capacitor discharge into a pulse transformer.

All of these approaches are difficult to miniaturize and to effect with limited battery power while maintaining an effective stimulus. The induction coil mode stores energy in the coil's magnetic field, and the energy is delivered by the collapsing inductive field. As the coil is made smaller, less energy can be stored and the shock becomes insufficient to control the animal.

The alternating current mode is limited to low frequencies because the physiological response diminishes with increasing frequency. For a given frequency, as the step-up transformer is made smaller, it is not possible to maintain the necessary primary inductance to keep the transformer core from saturating, which leads to excessive current consumption and diminished output.

The direct current mode stores the energy on a high voltage filter capacitor. Typically the high voltage to be stored on the capacitor is generated by circuitry similar to the alternating current mode just described, except the high voltage is rectified either by half wave, full wave, or voltage multiplier rectification. D.C.-to-D.C. step-up circuits are known for photomultiplier and photoflash circuits. In modern photoflash applications a high frequency is used with a small transformer. A rectifier is used to supply charge to a storage capacitor. If the circuit were to be used in an animal control system, the high voltage storage capacitor would be large and is difficult to miniaturize. The charge may also remain on the capacitor and shock the animal at an inappropriate or unexpected time. Typically a high current is taken from an AA size cell, which is comparatively large and heavy for an animal control system. Further such circuits are not designed for microprocessor control.

The pulse mode uses a pulse transformer with excellent high frequency capability; however, the primary to secondary turns or voltage ratio is limited to low ratios in order to maintain a high self-resonant frequency. As consequence, to achieve high voltages, a high voltage must be supplied to the primary. The high voltage may be supplied by circuitry similar to the direct current mode just described and with the inadequacies just described.

Thus there remains a need for a shock system that can be controlled by a microprocessor, is small and is operable by the limited voltage and current capabilities of a small battery.

Battery powered apparatus that combines low power microprocessors with high power circuits, such as electronic shockers, require power management because the microprocessor may malfunction if the power supply fluctuates excessively. It is well known that the maximum power is obtained from a source when the load is matched. This applies to batteries as well. In a simple matched system the load resistance would be equal to the source resistance, i.e. the internal battery resistance (more correctly when the source and load are conjugate impedances, but considering only the resistance is sufficient in this application). In such a system the terminal voltage of the battery drops to half the open circuit value. Thus a 3-volt battery will drop to 1.5 volts under a matched load. Microprocessors usually fail when the supply voltage drops by half. Also the internal resistance of a battery increases near the end of battery life. Thus, even a load resistance that is higher than the normal battery internal resistance will become significant as the battery nears end of life. To keep the microprocessor from malfunctioning, it is well known to isolate the microprocessor and other circuits from temporary drops in supply voltage by using a diode feeding a capacitor, the latter maintains the voltage supplied to the microprocessor. The typical voltage drop across a silicon diode is 0.7 volts. Even Schottky diodes have 0.3 volts drop or more. This is too much of a voltage drop in a low voltage battery system. For example a fresh 3-volt lithium battery may supply only 2.3–2.7 volts through a diode isolation circuit. This may be insufficient voltage to reliably operate the microprocessor. Batteries also drop in voltage near the end of battery life, and it is desirable to get maximal life from batteries by maintaining operation even at low battery voltages. Voltage losses in load isolation systems thus reduce the amount of useful battery life. While low drop out voltage regulators are available, they do not tolerate an input voltage lower than the load voltage or consume too much power, compromising battery life. The usual protection scheme for the regulator is to use a reverse coupled diode. The strategy is to drag the load voltage down as the supply voltage drops. This protects the regulator but fails to provide the needed isolation.

Thus there remains a need for a power management system that provides isolation from transient supply voltage drops, has a minimal voltage drop and is efficient so as to maintain long battery life.

Animal control systems that are containment or exclusion systems use an electro-magnetic radiated signal from a boundary wire and have a receiving antenna in the form of an unshielded inductor. Such inductors have a solenoidal reception field. Animals can learn to avoid the boundary signal by orienting themselves and, hence, the receiver to the blind spot of the solenoidal field. Simply adding another inductor physically oriented different to the first and paralleling the electrical circuits results in a new reception field that is the vector sum of the two inductors, i.e. another solenoidal field. One solution is to use two or three orthogonal inductors that are activated or switched on singly or in pairs by a controller or microprocessor, as taught in U.S. Pat. No. 5,425,330 and U.S. Pat. No. 5,435,271 to Touchton et al. The inductor or inductor pair having the strongest signal is then selected for further signal processing. This selection process takes time. This lost time diminishes the deterrent effect for those animals that attempt to run through the boundary. Another solution is to sequentially sample or switch on each antenna for a period of time, as taught in U.S. Pat. No. 5,460,124, U.S. Pat. No. 5,682,839, and U.S. Pat. No. 6,269,776 to Grimsley et al. The switching reduces the time the signal can be received, assuming not all three antennas are receiving sufficiently strong signal. This reduces the ability to authenticate a weak signal because some of the antennas, i.e. part of the time, offer insufficient signal to process. The switching also introduces a 0.1 second latency in detecting the boundary signal as it switches through antennas that are not receiving the boundary signal.

Thus there remains a need for an antenna system that is omnidirectional and does not incur the lost time required for selection of the strongest signal or is reduced in ability to authenticate a weak signal or has a detection latency.

Often it is desirable to customize the control parameters of a system for controlling animal behavior. Some systems change characteristics of the transmitter which the receiver detects and modifies the stimulus accordingly. In others systems the receiver is programmed with control parameters, particularly when no transmitter is involved as with bark inhibitors or when multiple animals of differing personality are to be controlled by the same signal or transmitter.

Programming the control parameters in a receiver can be effected by an external magnet and an internal magnetically responsive element, such as a reed switch or a Hall effect device etc. This form of programming is limited to fairly simple control parameters. Complicated control parameters can be programmed by a socket that allows access to the controller as in U.S. Pat. No. 5,435,271. In common all receiver programming access needs to protect the waterproofing of the receiver. The magnet programmer maintains a closed receiver but is limited to simple parameters. The programming socket of U.S. Pat. No. 5,435,271 is waterproof but requires removal of the battery.

Thus there remains a need for programming access that maintains the receiver integrity and allows complicated control parameters.

SUMMARY OF THE INVENTION

The animal control method and system of this invention, overcomes many of the deficiencies of the conventional animal control systems of the prior art. A particular object of this invention is achieved by innovative circuitry, which reduces the weight and volume of the control system and uses a small amount of power so that it may be applied to smaller animals such as lap dogs and cats.

This invention provides an animal control system comprising a system to receive a control signal such an electromagnetic boundary signal, a audio bark signal, an ultrasonic perimeter signal, a magnetic boundary signal, or a radio signal and to generate a correction stimulus comprising a shock system. The shock system is typically coupled to a microprocessor that controls the shock system. Other controllers may be used. A simple and efficient shock system comprises a correction signal generator coupled to a step-up transformer, the output of which is coupled to a rectifier. The output of the rectifier is coupled to electrodes that contact the animal to provide the correction stimulus. The correction signal generator is typically under a controller or microprocessor control.

It was found that alternating current frequencies above about 5 kilohertz were in-sensible and hence ineffective, at least on a human. It is believed that other animals have similar frequency limits. Thus, in order to use a high frequency to permit a small transformer, it is necessary to rectify the high voltage output. But this conventionally requires a high voltage filter capacitor, which is physically large. Surprisingly, it was found that the rectified high frequency voltage without a filter capacitor, i.e. an unfiltered unipolar high voltage, was as effective a correction stimulus as a capacitor filtered voltage. Elimination of a high voltage filter capacitor reduces the weight and physical volume of the shock system. Rectifying means to change a bipolar voltage, a voltage having both positive and negative excursions, into a unipolar voltage, a voltage having only positive or only negative excursions.

It is well known that smaller transformers may be used, for the same power transferred, by raising the frequency of operation. Furthermore, a large step-up ratio is required in order to raise a low battery voltage, such as 3 volts, to a voltage suitable for a correction stimulus, such as 330 volts. This requires a transformer turns ratio of 1 to 110. For example if the primary winding requires 12 turns to achieve a sufficient inductance to keep the transformer from saturating at the operating frequency, the secondary winding must be 1320 turns. Such a large number of turns will exhibit a large inductance, proportionate to the square of the number of turns. The otherwise small interwinding capacitance resonates with the large inductance to give a relatively low self-resonant frequency. Attempts to operate the transformer above the self-resonant frequency results in high losses because the secondary of the transformer acts as a low-pass filter. However, operation at the resonant frequency provides good low loss performance. For a small "E" core ferrite transformer, less than a centimeter on a side, with 1320 turns for the secondary, the resonant frequency measured 19 kilohertz. For a small "pot" core ferrite transformer, approximately 7 millimeters in diameter, with 440 turns for the secondary, the resonant frequency measured 80 kilohertz. For the purposes of this invention, a high frequency is any frequency greater than that where the physiological effect of the alternating current begins to decline, i.e. above about 5 kilohertz.

In order to effectively use the limited battery power available, it is useful to maximize the physiological effect. This can be accomplished by allowing the animal's nerve endings to repolarize. Once the nerve has depolarized in response to the correction stimulus, further application of the stimulus is a waste of power. Thus it is more effective to apply an on-off control stimulus. For example, to repetitively apply a voltage of sufficient intensity and duration to substantially depolarize the nerves, then to turn the voltage off and allow the nerves to repolarize and then to reapply the voltage, etc. It is desired to apply the voltage 5 to 200 times per second. Fewer than 5 fails to impress an urgency of response while greater than 200 looses the insistence of sensibly discrete actions. Thirty repetitions per seconds are preferred. In other words, the controlled on time of the stimulus signal is one sixtieth of a second and the off time of the stimulus signal is one sixtieth of a second, where upon the stimulus signal is again reapplied for a sixtieth of a second and so forth.

A less strong or graded correction stimulus can be achieved by reducing the duration and/or intensity of the voltage so as to not extensively depolarize the nerves. For example the on time of the stimulus signal may be reduced. To keep the perceived stimulus signal constant the off time of the stimulus signal may be increased by the amount of time the on time is reduced, so as to keep the sum of the on time and off time constant.

Furthermore, a more effective correction stimulus may be created by continuing the correction stimulus voltage for periods of time, including the on time and off time control of the correction stimulus, then discontinuing the correction stimulus voltage for periods of time. The animal receives the aversive correction stimulus and is allowed to react to it without being so affected as to be unable to respond to the correction stimulus. The stimulus may be continued or applied for 0.5 to 20 seconds then discontinued or stopped for 0.5 to 20 seconds. The correction stimulus may then be continued to further control the animal. Of course, the control signal should still present to continue the correction stimulus.

Also it may be desirable to stop the control signal all together after a time because the animal may be trapped or unable to react to the control stimulus. For example, after 20 to 120 seconds, the correction stimulus may be stopped for an extended time, 4 minutes or more, or until the control signal is not detected, which resets the sequence of the correction stimulus.

A method of utilizing a small, efficient, and effective shock system for animal control comprises a) mounting on the animal a controller to receive a control signal, b) generating a correction signal, c) coupling the correction signal to a step-up transformer to produce a stepped-up correction signal, c) rectifying the stepped-up correction signal, and d) applying the rectified stepped-up correction signal to the animal as a correction stimulus to control the animal. Mounting means to put into proper position for use.

This invention provides programming access that maintains the receiver integrity and allows more complicated control parameters by applying programming signals to the stimulus electrodes. The polarity of the programming signals is opposite that of the correction signal such that the rectifying means of the shock system isolates the shock system from the programmer. The controller is also isolated from the correction stimulus.

This invention provides a power isolation system for the low battery voltages commonly used, such as 3 volts, to maintain operational voltage for the microprocessor and other signal processing circuits by utilizing a pass transistor. A FET would be ideal in terms of low voltage drop but it is symmetric so that it will conduct from the higher to the lower voltage whether it is the power source or the load. Additional circuitry and power consumption would be required to overcome this deficiency. A bipolar transistor has a small voltage drop when saturated, about 50 to 300 millivolts. The bipolar transistor is symmetric in that the emitter and collector can be interchanged. However, most bipolar transistors are optimized for other performance characteristics and are not symmetrical in performance. It was found that high forward gain transistors (forward current gain greater than 50) tend to have a low reverse gain, (reverse current gain less than 1), i.e. when the collector and emitter are interchanged. Thus a bipolar transistor with a large forward gain and a small reverse gain can be used to supply a relatively large current from the power source to the load but will supply only a small reverse current from the load to the "source" when the source is a lower voltage than the load voltage. With the collector connected to the load, the transistor base current is supplied by a resistor to ground of a preferred value just sufficient in resistance to saturate the transistor in normal operation so that the voltage drop is minimized. Other sources of base current may be used. The base current may be fixed such that additional circuitry is not required, for example to turn the base current on and off, to achieve the power isolation. In this configuration, when the "source" voltage drops below the load voltage the transistor is substantially non-conducting and only a small reverse or "leakage" current will flow from the load. Thus good isolation is provided with a minimal voltage drop and with a simple compact circuit.

An animal containment or exclusion system is a particular kind of animal control system that uses a boundary signal to restrict the animal to approved regions. A boundary signal is created by applying an "RF" signal ("radio frequency" although the frequency may be as low as 7 kilohertz) to a perimeter wire to radiate an electromagnetic signal that a receiver mounted on the animal can receive to activate a correction stimulus. The boundary signal is received by an inductor and it is necessary to use two or more inductors to overcome the blind spots in the characteristic solenoidal receiving field of a single inductor. Connecting the inductors together will result in an equivalent solenoidal receiving field that is equivalent to a single inductor. Thus the blind spots will not have been removed.

It is desired to combine the signals from a plurality of inductors, each physically oriented in a different direction without getting an equivalent solenodial field. To do this, the axes of the inductors are physically oriented in different directions, substantially orthogonally, and the individual received signals modified so that combining or adding the signals does not result in an equivalent solenoidal receiving field or a field with nulls.

This invention shifts the electrical phase differently of the received signals before combining them, particularly signals at the carrier frequency. The combined signals do not become an equivalent solenoidal field because signals of different electrical phase cannot cancel each other to give a blind spot.

In a preferred embodiment two inductors receive the boundary signal, the received signals are shifted 90 electrical degrees relative to each other so that they can be considered as a sine and cosine wave. It is well known mathematically that the sine and cosine are orthogonal (not in the physically orthogonal sense above) and cannot cancel each other. However, any electrical phase shift greater than about 45 electrical degrees will substantially eliminate the signal cancellation that results in nulls or an equivalent solenoidal field of response, provided that the inductors are oriented differently. Shifting the relative electrical phase 135 degrees gives performance similar to that of 45 degrees but as if one of the inductors were physically inverted.

In a preferred embodiment two inductors receive the boundary signal, the received signals from each inductor are amplified and the amplifier is constructed to shift the electrical phase of the signal. The two amplifiers are constructed to shift the phase differently. It is preferred that the phase is different by at least 45 electrical degrees and 90 degrees is more preferred.

It is common to use the inductor as part of a tuned circuit that is resonated by a capacitor to a frequency matched to the boundary signal frequency, also called the carrier frequency. This is advantageous because interfering signals can be rejected. A high "Q" ("quality factor" affecting the width of the frequency response) inductor-capacitor circuit may be used to further reject interfering signals. In a preferred embodiment of this invention, at least one of tuned circuits is tuned slightly away from the boundary signal frequency so that the electrical phase of the received signal is shifted.

In a preferred embodiment two inductors are substantially physically orthogonal and the electrical phase of the received boundary signals outputted by the inductors are shifted by tuning a first inductor and a first capacitor and second inductor and second capacitor to frequencies above and below the carrier frequency, respectively, so that the electrical phase difference between them is greater than 45 degrees, preferably 90 degrees. Tuned above means the resonant or most sensitive frequency of the inductor and capacitor is greater than the carrier frequency, and analogously for tuned below. The Q may be modified by shunting the inductors with resistors.

With only two inductors and with phase-shifted signals, a null in the received signal still remains in one plane. Use of three inductors oriented in three different directions will eliminate the null altogether. In a preferred embodiment three inductors are substantially physically orthogonal and receive the boundary signal, the received signals are shifted 60 electrical degrees relative to each other. However, any electrical phase shift greater than about 30 electrical degrees but less than about 90 degrees will substantially eliminate the signal cancellation that results in blind spots in the field of response.

In a preferred embodiment three inductors are substantially physically orthogonal and receive the boundary signal, the received signals from each inductor are amplified and the amplifier is constructed to shift the electrical phase of the signal. The three amplifiers are constructed to shift the phase differently. It is preferred that the phases are different from each other by 60 electrical degrees. The inductors may also be resonated with capacitors and the Q adjusted with resistors.

In a preferred embodiment the electrical phase of the received boundary signals are shifted by tuning a first inductor and a first capacitor and a third inductor and a third capacitor to frequencies above and below the carrier frequency, respectively, so that the electrical phase difference is 60 degrees and tuning a second inductor and second capacitor to the carrier frequency. The sensitivity of second inductor and second capacitor may be matched to that of the others at the carrier frequency.

A method of animal control utilizing an antenna system for animal containment which does not need switching, does not give up authentification of weak signal, has no latency, and has fewer or no nulls in the response field comprises the steps: a) mounting on an animal a receiver to receive a boundary signal, b) receiving the boundary signal with a plurality of receiver subsystems, each having substantially orthogonal physical axes, c) shifting the electrical phase of the received boundary signals, forming shifted received boundary signals, d) combining the shifted received boundary signals, e) detecting the combined shifted received boundary signals and f) generating a correction stimulus to control the animal.

The phase shifting also may be accomplished by tuning the inductor and capacitor and phase shifting by the amplifier.

BRIEF DESCRIPTION OF THE DRAWINGS

The following description of this invention will be better understood when read in conjunction with the accompanying drawings in which.

DETAILED DESCRIPTION OF THE PREFERRED EMBODIMENT

Figure 1:
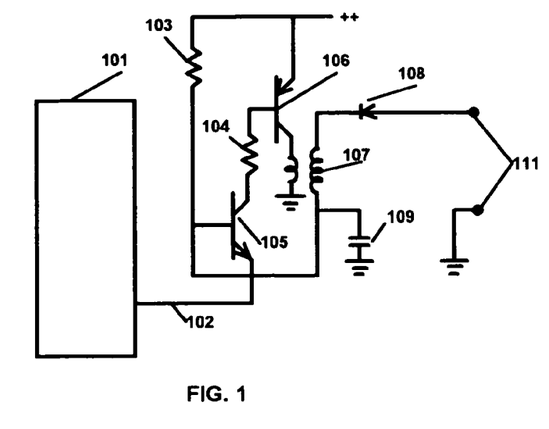
FIG. 1 is a partial schematic drawing of a shock system.

The shock system of this invention is better understood by reference to FIG. 1 in which a partial circuit is drawn. The controller 101, possibly a microcomputer, receives a control signal, not shown, and commands a correction stimulus to be generated by dropping the voltage on wire 102 from a value near the supply voltage indicated as ++, to zero volts. Wire 102 is connected from the controller 101 to the emitter of NPN transistor 105. Lowering the voltage on the emitter causes current to flow in the transistor's base from the supply voltage through resistor 103. The base current is increased by the gain of transistor 105 and flows from the collector through resistor 104 to the base of PNP power transistor 106. Transistor 106 amplifies the base current to flow from its collector through the primary winding of step-up transformer 107. The current in the primary of transformer 107 creates a primary voltage and is coupled to its secondary to give a much larger voltage. The secondary of transformer 107 is coupled to fast recovery rectifier 108, the other side of which is connected to one of the stimulus electrodes 111 for applying the correction stimulus to the animal. The other stimulus electrode 111 is connected to ground or common to complete the circuit. The others side of the secondary is connected to the base of transistor 105. Also connected to the base of transistor 105 is capacitor 109 the other side of which is connected to ground. Capacitor 109 is selected during design to adjust the phase of current through transistor 106 relative to the voltage across transformer 107, to improve the efficiency of power conversion.

Surprisingly it was found that good physiologic response was generated without using an output storage or filter capacitor across stimulus electrodes 111. However, a small capacitor might be placed across the stimulus electrodes 111 to protect the circuit from static electric discharges. But it is preferred to keep the capacitance across the electrode to a minimum, less than about 10 nanofarads, to allow rapid build up and decay of the correction stimulus voltage. The correction stimulus voltage should decay more than 50% during the off time of the on time/off time sequence.

In a preferred embodiment, the transformer 107 was a 8.3 mm wide by 8 mm high by 3.6 mm wide ferrite "E" core with 12 primary turns and 1320 secondary turns, for a voltage step-up of 110. With a supply voltage of 3 volts, from a lithium battery not shown, nearly 300 volts is output from the transformer 107 depending on the degree to which the voltage of the battery is diminished by the heavy load of the shocker. Component were 103, 10,000 ohms; 104, 100 ohms; 105, 2N3904; 106, FMMT591A; 108 FR16; and 109, 1000 picofarads. In a preferred embodiment, an even smaller transformer 107 was a 7 mm diameter by 4 mm high ferrite pot core with 4 primary turns and 440 secondary turns.

Figure 7:
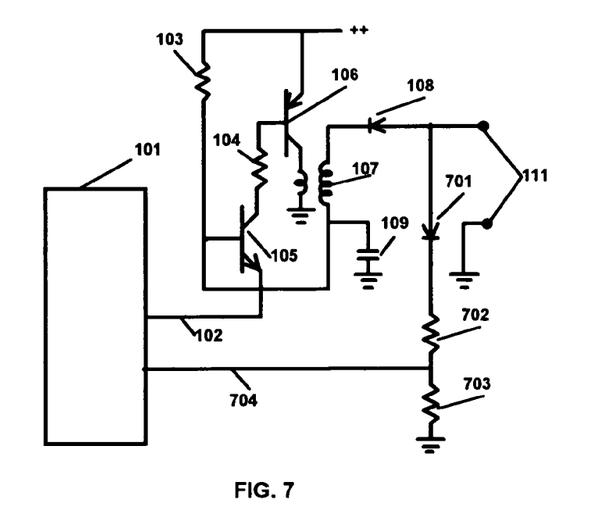
FIG. 7 is a partial schematic drawing of a programming system.

The programming system of this invention is better understood by reference to FIG. 7 in which a partial circuit is drawn. The components common to FIG. 1 have the same numbering. The programming system is adapted for use with the shock system such that the programming signals are applied to the correction stimulus electrodes, 111, in a polarity opposite to the correction stimulus. As shown in FIG. 7, the unipolar correction stimulus will be of negative polarity compared to ground (as denoted by the common ground symbol). This unipolar correction stimulus is blocked from the controller, 101, by diode 701. However an external positive polarity voltage applied to the correction stimulus electrodes, 111, will feed a voltage to the controller, 101, through resistor 702, which is primarily used to limit stray currents from damaging the controller, 101. The resistor, 703, is used to drain stray currents to ground so that they do not flow into the controller, 101. Since the correction stimulus electrodes already must maintain the integrity and waterproofness of the receiver, the programming access naturally maintains the integrity. As will be apparent to those skilled in the art, the polarity of the correction stimulus and the programming signals can be interchanged, in which case the ground connection to resistor 703 might be attached to the positive supply of the controller.

Figure 2:
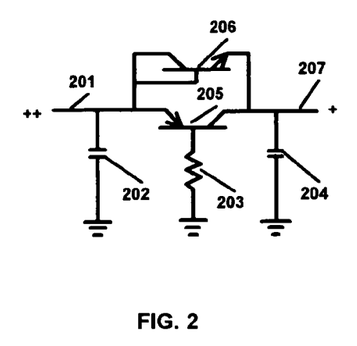
FIG. 2 is a partial schematic drawing of a power isolation system.

The power isolation system of this invention is better understood by reference to FIG. 2 in which a partial schematic circuit is drawn. The battery, not shown, supplies a voltage (indicated as ++) to input wire 201. The wire is connected to filter capacitor 202 and to the emitter of bipolar PNP transistor 205. The base of transistor 205 is connected to ground through resistor 203. The collector of transistor 205 is connected to storage capacitor 204 and output wire 207. NPN transistor 206 is diode connected with its collector and base connected to input wire 201 and its emitter connected to output wire 207. In operation diode connected transistor 206 supplies current to the output from the input when the battery is first connected to give a rapid voltage rise as required for some microcomputers. But since the voltage drop across transistor 206 is about 0.7 volts, transistor 205 supplies additional current to charge the output capacitor 204 to with in about 80 millivolts of the input voltage. The current flowing at the base of transistor 205 through resistor 203 is small, fixed or nearly constant, about 1 microamp. Because the gain of transistor is chosen to be high, the collector is saturated giving a low emitter to collector voltage. The diode-connected transistor could be eliminated if there is no need to rapidly charge capacitor 204. Considering the currents of typical animal control systems, a diode such as a 1N4448 could be used in place of the diode-connected transistor.

The component values were; 202, 440 microfarad; 203, 2 megohm; 204, 220 microfarad; 205, 2N5087; and 206, 2N3904.

With 3 volts on wire 201, the initial current supplied to 207 at ground potential by transistor 205 without 206 in the circuit was 400 microamps. With 3 volts on wire 207 and zero volts on 201, the reverse current through transistor 205 was 4 microamps, i.e. substantially nonconducting. With the voltages used in this application, the forward to reverse gain of the transistor is 100:1. In normal operation, with 15 microamps drawn from 207, the voltage drop across transistor 205 was 80 millivolts after charging 204.

Figure 3:
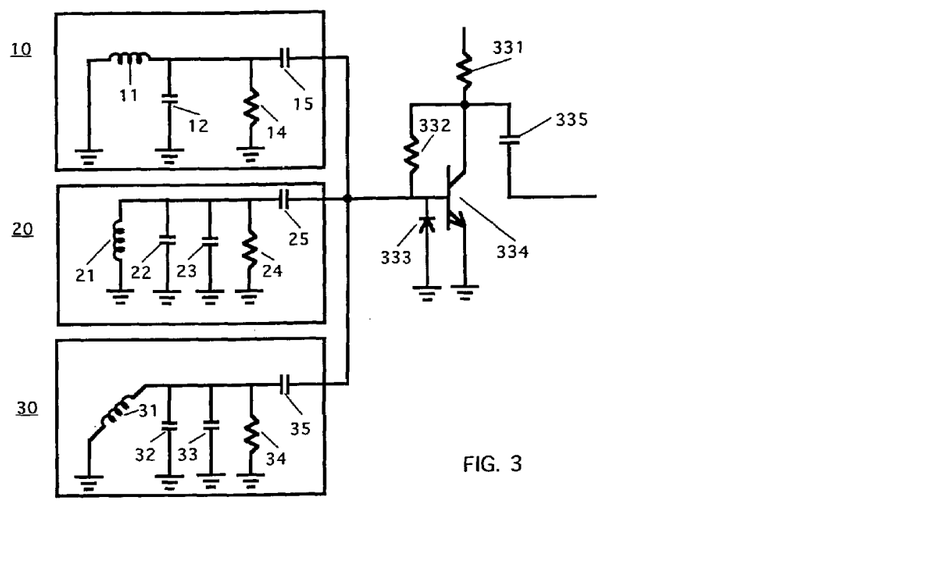
FIG. 3 is a partial schematic drawing of a boundary signal receiver.

A preferred receiver of this invention is better understood by reference to FIG. 3 in which a partial circuit is drawn. The first antenna system 10 comprises the inductor 11, capacitor 12, and resistor 14 connected in parallel to selectively receive the boundary signal carrier frequency. The output of circuit 10 is coupled through capacitor 15 to the base of transistor 334. The second antenna system 20 comprises the inductor 21, capacitor 22, capacitor 23, and resistor 24 connected in parallel, to also selectively receive the boundary signal carrier frequency. The output of circuit 20 is coupled through capacitor 25 to the base of transistor 334. The third antenna system 30 comprises the inductor 31, capacitor 32, capacitor 33, and resistor 34 connected in parallel, to also selectively receive the boundary signal carrier frequency. The output of circuit 30 is coupled through capacitor 25 to the base of transistor 334. The inductors are drawn in different orientations to represent the different physical alignments of the physical devices that are preferably physically orthogonal. The collector of transistor 334 is connected to a supply voltage, not shown, through resistor 331. The operating base current is supplied by resistor 332, connected between the base and collector of transistor 334. The cathode of diode 333 is connected to the base of transistor 334 and the anode to ground. Diode 333 protects transistor 334 from excessive reverse voltage when the inductors are very near a boundary wire and the signal is very large. The signal amplified by transistor 334 is coupled to additional conventional and known in the art circuitry, not shown, by capacitor 335 connected to the collector of transistor 334.

Components were; 11, 32 millihenry; 12, 6.8 nanofarads; 14, 68 kiloohms; 15, 100 picofarads; 21, 32 millihenry; 22, 6.8 nanofarads; 23, 330 picofarads, 24, 33 kiloohms; 25 100 picofarads; 31, 32 millihenry; 32, 6.8 nanofarads; 33, 680 picofarads, 34, 68 kiloohms; 35 100 picofarads; 331, 470 kiloohms; 332, 2 megohms; 333, 1N4448; 334, 2N5089; and 335, 220 picofarads.

The phase of the received boundary signal is affected by the resonant characteristics of receiving antennas 10, 20, and 30. In a preferred embodiment, antenna 10 is tuned above the boundary signal carrier frequency, 10.6 kilohertz. Antenna 20 is tuned to the boundary signal carrier frequency by the addition of capacitor 23. Antenna 30 is tuned below the boundary signal carrier frequency by the addition of capacitor 33. The resistors 14, 24, and 34 control "Q" of the resonant circuits. Resistor 24 also affects the sensitivity of antenna 20 and can be used to match it to antennas 10 and 30 for reasons illustrated in FIG. 6. The values of resistance are chosen to allow normal manufacturing tolerance components to be used and still operate according to this invention. Other means may be used to affect the difference in the tuning. For example the value of the inductors might be made different. Instead of paralleling capacitor 23 across capacitor 22, a different value of capacitor 22 might be chosen eliminating the need for capacitor 23, and similarly for capacitor 33.

Figures 4, 4A:
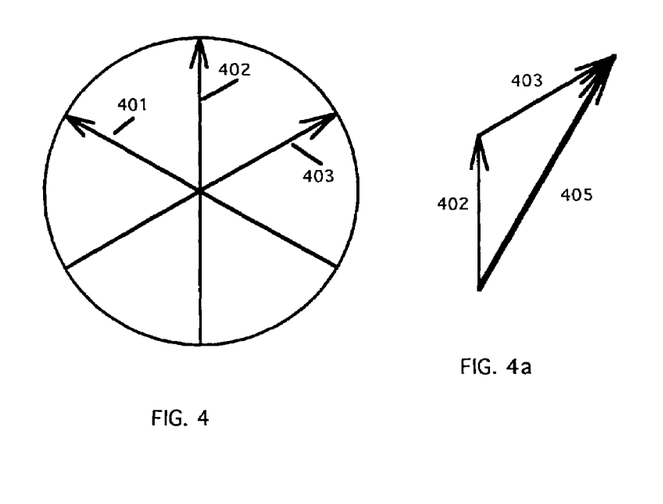
FIG. 4 is an illustration of signals with differing phase.
FIG. 4a is an illustration of the combining of signals with differing phase.

FIG. 4 illustrates three received signals with differing phase. If signal 402 is taken as zero degrees phase (electrical), then 401 is −60 degrees and 403 is +60 degrees. While 401 and 403 are 120 degrees different as drawn, it is recognized that for example 401 might be negative in amplitude in which case 401 and 403 would equivalently be 60 degrees different rather than 120 degrees. The amplitudes of the signals vectors are drawn as equal in magnitude. As can be seen, for three antennas, the 60 degrees phase difference distributes the phase differences optimally. Of course, the amplitudes will in general be different in use depending on the orientation of the physical antenna to the boundary signal. Also the amplitude and phase depends on the exact value of the components.

FIG. 4a illustrates the vector resultant of adding equal amplitude signals from 402 and 403 of FIG. 4 as occurs when 402 and 403 are each 45 physical degrees to the boundary signal. The resultant 405 is greater in amplitude than either of the individual signals.

Figure 4B:
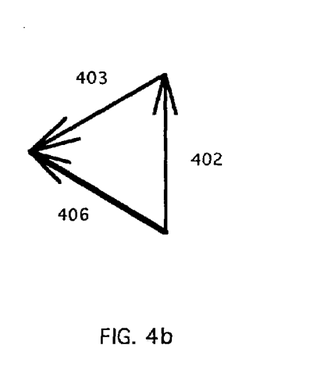
FIG. 4b is an illustration of the combining of signals with differing phase.

FIG. 4b illustrates the vector resultant of adding equal amplitude signals from 402 and 403, except the latter's amplitude is negative. A negative amplitude is equivalent to a 180-degree shift and naturally occurs if the winding sense of the inductor is reversed or if the receiver is turned 180 degrees about an axis associated with the antenna producing signal 402. The resultant 406 is approximately equal in amplitude to the individual signals but somewhat less than that of 405. It is important to note that there is no orientation, which will produce a null, unlike a single antenna. While the resultant amplitude may vary some depending on the orientation, the distance at which the boundary signal is detected is not significantly different.

Best performance is achieved with the phases conform to the above, however the actual phase may be more or less and achieve the elimination of nulls in the response. In the case of 2 inductors the phase difference may be from about 45 to 135 degrees. In the case of three inductors the minimum phase difference may be from 30 to 90 degrees.

Best performance is achieved with the inductors physically orthogonal (90 degrees) to each other. Substantially physically orthogonal means the orientation of any 2 inductors may be from 45 to 135 physical degrees and still permit the effective elimination of nulls from the receiving field.

Figure 5:
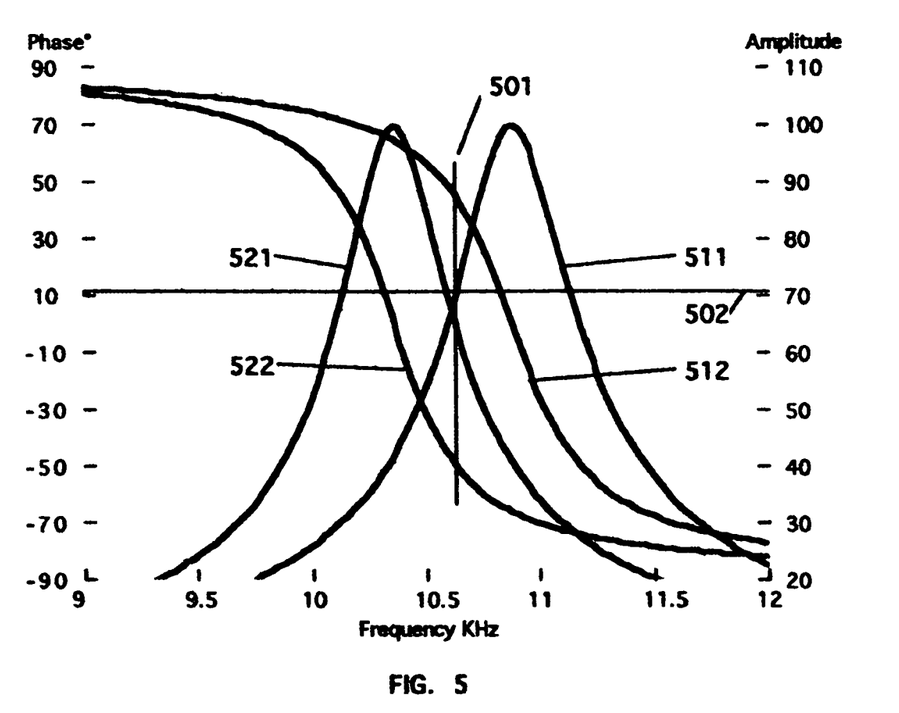
FIG. 5 is a partial schematic drawing of an alternate boundary signal receiver.

A preferred embodiment is shown in FIG. 5; the antennas 510, 520, and 530 are coupled to individual amplifiers. The antenna 510, comprising the parallel components inductor 511, capacitor 512 and resistor 514, is coupled by capacitor 515 to the base of transistor 554. The collector of transistor 554 is connected to a power source through resistor 551. Resistor 552 is connected between the base and collector of transistor 554 to provide operational base current. Diode 553 is to protect transistor 554 from excessive reverse voltage. Capacitor 555 couples the amplified signal to wire 580 that conveys the signal to other common and known in the art circuit circuitry, not shown. The antenna 520, comprising the parallel components inductor 521, capacitor 522 and resistor 524, is coupled by capacitor 525 to the base of transistor 564. The collector of transistor 564 is connected to a power source through resistor 561. Resistor 562 is connected between the base and collector of transistor 564 to provide operational base current. Diode 563 is to protect transistor 564 from excessive reverse voltage. Capacitor 565 couples the amplified signal to wire 580 that conveys the signal to other common and known in the art circuit circuitry. Capacitor 566 causes a lag in the phase of the signal. Making the value of capacitor 555 smaller than 565 causes a relative lead in phase of the signal from 510. The antenna 530, comprising the parallel components inductor 531, capacitor 532 and resistor 534, is coupled by capacitor 535 to the base of transistor 564. The collector of transistor 574 is connected to a power source through resistor 571. Resistor 572 is connected between the base and collector of transistor 574 to provide operational base current. Diode 573 is to protect transistor 574 from excessive reverse voltage. Capacitor 575 couples the amplified signal to wire 580 that conveys the signal to other common and known in the art circuit circuitry. The sensitivity or gain of 530 and its amplifier (574) needs to be lower that that of 510 and 520 and their amplifiers (for reasons illustrated in FIG. 6) this may be accomplished with, for example, selected values of resistor 534 or resistors 571 or 572. This circuit configuration can utilize a narrower antenna resonance, i.e. higher Q, for a given component tolerance than the circuit of FIG. 3 and eliminate potential interfering signals. The antenna and the associated amplifier is a receiver subsystem.

Components were; 511,521,531, 33 millihenry; 512,522, 532, 6.8 nanofarads; 514,524,534, 100 kiloohms; 515,525, 535, 100 picofarads; 551, 470 kiloohms; 552, 2 megohms; 553, 1N4448; 554, 2N5089; 555, 220 picofarads; 561, 470 kiloohms; 562, 2 megohms; 563, 1N4448; 564, 2N5089; 565, 1000 picofarads; and 566, 150 picofarads; 571, 470 kiloohms; 572, 1 megohm; 573, 1N4448; 574, 2N5089; 575, 1000 picofarads.

Figure 6:
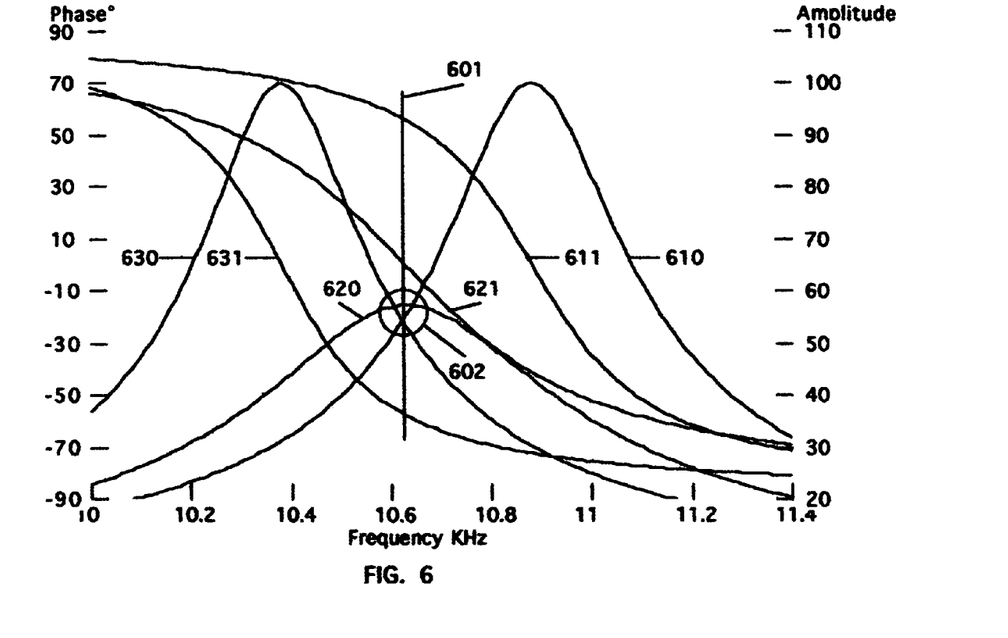
FIG. 6 is a graph of phase and amplitude responses of a three tuned circuit antenna.

FIG. 6 illustrates the phase and amplitude response with antenna component values of the preferred embodiment of FIG. 3. The amplitude response 610 to frequencies received by antenna 10 shows a peak response defined as 100 near 10.9 kilohertz and 55 at the carrier frequency 601. Antenna 10 shows a phase response 611 of approximately +60 degrees at the carrier frequency 601. The amplitude response 620 to frequencies received by antenna 20 shows a peak response of approximately 55 at the carrier frequency 601, 10.62 kilohertz. Antenna 20 shows a phase response 621 of approximately zero degrees at the carrier frequency. The amplitude response 630 to frequencies received by antenna 30 shows a peak response of 100 near 10.4 kilohertz and 55 at the carrier frequency 601. Antenna 20 shows a phase response 631 of approximately −60 degrees at the carrier frequency 601. The circle 602 is meant to draw attention to the operational region of the drawing where the three antennas are of approximately equal sensitivity, within the variances of normal production components.

With the teachings of this invention, it will be apparent to those skilled in the art as to how to change the components for different applications, such as carrier frequency or greater sensitivity with higher inductance antennas or other applications utilizing electric correction stimuli.

What is claimed is:

1. An animal control system to receive a control signal and generate a correction stimulus comprising:
   (a) a correction signal generator having a frequency and controlled on times and off times,
   (b) a step-up transformer, having a self-resonant frequency, coupled to the correction signal generator, and
   (c) a rectifier coupled to the step-up transformer to produce an unfiltered unipolar high voltage as the correction stimulus.

2. The system as in claim 1 wherein the frequency of the correction signal generator is matched to the self-resonant frequency of the step-up transformer.

3. The system as in claim 1 wherein the on times and off times of the correction signal generator are controlled on and off from 5 to 200 times per second.

4. The system of claim 3 wherein the on times and off times are continued for periods from 0.5 to 20 seconds and discontinued for periods from 0.5 to 20 seconds.

5. The system of claim 3 wherein the on time is decreased and the off time is increased to keep the sum of the on time and the off time constant.

6. The system of claim 3 wherein the on time is decreased and the off time is increased to keep the sum of the on time and the off time constant and the on time and off time are continued for periods from 0.5 to 20 seconds and discontinued for periods from 0.5 to 20 seconds.

7. The system as in claim 1 further comprising a power isolation system comprising:
   a high forward gain, low reverse gain bipolar transistor with a fixed base current, the transistor saturated in normal operation, and substantially non-conducting during power isolation.

8. The system as in claim 1 wherein the control system is programmed by a programming signal applied to the correction stimulus electrodes of polarity opposite to the correction stimulus.

* * * * *